United States Patent
Osaka

(10) Patent No.: US 8,384,368 B2
(45) Date of Patent: *Feb. 26, 2013

(54) POWER CONVERSION APPARATUS AND CONTROLLER THEREOF

(75) Inventor: Shohei Osaka, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 432 days.

This patent is subject to a terminal disclaimer.

(21) Appl. No.: 12/705,257

(22) Filed: Feb. 12, 2010

(65) Prior Publication Data

US 2011/0075463 A1 Mar. 31, 2011

(30) Foreign Application Priority Data

Sep. 28, 2009 (JP) ................................. 2009-222703

(51) Int. Cl.
*G05F 1/00* (2006.01)

(52) U.S. Cl. .................... 323/285; 323/223; 323/224

(58) Field of Classification Search .......... 323/222–224, 323/271, 273, 282–290, 351; 363/16–17, 363/37, 41, 21.06, 21.11, 97, 98, 132; 327/108, 327/217, 382, 388, 333, 530, 538

See application file for complete search history.

(56) References Cited

U.S. PATENT DOCUMENTS

| | | | | |
|---|---|---|---|---|
| 5,045,712 A * | 9/1991 | Baggenstoss | ................... | 307/29 |
| 6,738,274 B2 * | 5/2004 | Prasad et al. | ................... | 363/70 |
| 6,980,446 B2 * | 12/2005 | Simada et al. | ................... | 363/49 |
| 7,019,497 B2 * | 3/2006 | Umminger et al. | ........... | 323/220 |
| 7,250,746 B2 * | 7/2007 | Oswald et al. | ................ | 323/284 |
| 7,944,256 B2 * | 5/2011 | Masuda | ........................ | 327/156 |
| 8,138,737 B2 * | 3/2012 | Osaka | .......................... | 323/285 |

FOREIGN PATENT DOCUMENTS

| | | |
|---|---|---|
| JP | 62-58871 | 3/1987 |
| JP | 63-186555 | 8/1988 |
| JP | 3570113 | 9/2004 |

OTHER PUBLICATIONS

U.S. Appl. No. 12/693,827, filed Jan. 26, 2010, Osaka.

* cited by examiner

*Primary Examiner* — Rajnikant Patel

(74) *Attorney, Agent, or Firm* — Oblon, Spivak, McClelland, Maier & Neustadt, L.L.P.

(57) ABSTRACT

A power conversion apparatus includes a converter having an input power source Vin, a reactor L1, a switching element Q1, and a rectifying element D1, a smoothing capacitor C1 connected to an output terminal of the converter, and a controller 10*b* to turn on/off the switching element and thereby control power to be outputted from the converter. The controller has a pulse generator 15 to generate a pulse signal according to an input voltage to the converter and an output voltage from the converter, the pulse signal being used to turn on/off the switching element. The controller also has an adjuster 18 to mask an ON time of the pulse signal for a predetermined time and thereby provide the pulse signal with an adjusted ON time, the adjusted ON time determining a duty ratio at which the switching element is turned on/off.

16 Claims, 13 Drawing Sheets

POWER CONVERSION APPARATUS AND CONTROLLER THEREOF

BACKGROUND OF THE INVENTION

1. Field of the Invention

The present invention relates to a power conversion apparatus and a controller for the power conversion apparatus.

2. Description of the Related Art

FIG. 1 is a circuit diagram illustrating a power conversion apparatus according to a related art. This power conversion apparatus is a current-critical power factor correction circuit.

In the power conversion apparatus of FIG. 1, a rectifier RC1 rectifies an AC voltage from an AC power source Vin into a DC voltage. Both output ends of the rectifier RC1 are connected to a series circuit that includes a first winding N1 of a step-up transformer T1, a switching element Q1 made of a MOSFET, and a current sensing resistor R5. The output ends of the rectifier RC1 are also connected to a series circuit of resistors R1 and R2.

Both ends of a series circuit of the switching element Q1 and current sensing resistor R5 are connected to a rectifying-smoothing circuit including a rectifier D1 and a smoothing capacitor C1. Both ends of the smoothing capacitor C1 are connected to a series circuit of resistors R3 and R4.

The resistors R1 and R2 work as an input voltage detector to divide an output voltage from the rectifier RC1 and provide an input voltage signal Vvin. The resistors R3 and R4 work as an output voltage detector to divide a voltage across the smoothing capacitor C1 and provide an output voltage signal Vfb.

A controller 10 includes a multiplier 11, an error amplifier 12, comparators CMP1 and CMP2, and an RS-flip-flop FF2. The error amplifier 12 amplifies an error between the output voltage signal Vfb and a reference voltage Vref and outputs an amplified error signal Vcmp. The multiplier 11 multiplies the input voltage signal Vvin by the amplified error signal Vcmp and outputs a multiplication result signal Vmul. The current sensing resistor R5 detects a current passing through the switching element Q1 and provides a current signal Vis.

The comparator CMP2 compares the current signal Vis with the multiplication result signal Vmul, and if Vis is equal to or larger than Vmul, outputs a high-level signal to a reset terminal R of the RS-flip-flop FF2. The comparator CMP1 compares a voltage generated by a second winding N2 of the step-up transformer T1 with a reference voltage Vr, and if the voltage of the second winding N2 is equal to or lower than Vr, outputs a high-level signal to a set terminal S of the RS-flip-flop FF2.

Namely, the result of comparison between the current signal Vis from the current sensing resistor R5 and the multiplication result signal Vmul from the multiplier 11 determines an ON time of the switching element Q1 and a change in the voltage polarity of the second winding N2 of the step-up transformer T1 determines an OFF time of the switching element Q1.

FIG. 2 illustrates operating waveforms at various parts of the power conversion apparatus of FIG. 1. In FIG. 2, Vmul is the multiplication result signal, Vis is the switching current of the switching element Q1 detected by the current sensing resistor R5, OUT is a drive signal for the switching element Q1, and zcd is a voltage polarity signal detected from the second winding N2 of the step-up transformer T1.

Other related arts are disclosed in, for example, Japanese Unexamined Patent Application Publications No. S62-58871 and No. S63-186555 and Japanese Patent No. 3570113.

SUMMARY OF THE INVENTION

The power conversion apparatus according to the related art of FIG. 1 must provide the step-up transformer T1 with the second winding N2 to detect the ON timing of the switching element Q1. This increases the cost of the apparatus. If the second winding N2 short-circuits, the first winding N1 of the step-up transformer T1 will decrease inductance, to cause a malfunction of the apparatus.

The present invention provides a power conversion apparatus and a controller for the power conversion apparatus that are manufacturable at low cost, have high functions, and are capable of conducting an appropriate switching operation without auxiliary windings even when a difference between input and output voltages is small and a voltage detection error causes a great variation in an OFF time of a switching element.

According to a first aspect of the present invention, the power conversion apparatus includes a converter having an input power source, a reactor, a switching element, and a rectifying element; a smoothing capacitor connected to an output terminal of the converter; and a controller configured to turn on/off the switching element and thereby control power to be outputted from the converter. The controller has a pulse generator configured to generate a pulse signal according to an input voltage to the converter and an output voltage from the converter, the pulse signal being used to turn on/off the switching element; and an adjuster configured to mask an ON time of the pulse signal for a predetermined time and thereby provide the pulse signal with an adjusted ON time, the adjusted ON time determining a duty ratio at which the switching element is turned on/off.

According to a second aspect of the present invention, the power conversion apparatus includes an interleave converter having an input power source and a plurality of converters that are connected in parallel with each other and each have a reactor, a switching element, and a rectifying element; a smoothing capacitor connected to an output terminal of the interleave converter; and a controller configured to turn on/off the switching elements of the converters and thereby control power to be outputted from the interleave converter. The controller has a pulse generator configured to generate pulse signals according to an input voltage to the interleave converter and an output voltage from the interleave converter, the pulse signals being used to turn on/off the switching elements, respectively; and an adjuster configured to mask an ON time of each pulse signal for a predetermined time and thereby provide the pulse signal with an adjusted ON time, the adjusted ON time determining a duty ratio at which each switching element is turned on/off.

According to a third aspect of the present invention, the power conversion apparatus includes a converter having an input power source, a reactor, a switching element, and a rectifying element; a smoothing capacitor connected to an output terminal of the converter; and a controller configured to turn on/off the switching element and thereby control power to be outputted from the converter. The controller has a pulse generator configured to generate a pulse signal according to an input voltage to the converter and an output voltage from the converter, the pulse signal being used to turn on/off the switching element; and an adjuster configured to adjust a duty ratio of the pulse signal so as to extend an OFF time of the switching element, the adjusted duty ratio being used to turn on/off the switching element.

According to a fourth aspect of the present invention, the power conversion apparatus includes an interleave converter having an input power source and a plurality of converters that are connected in parallel with each other and each have a reactor, a switching element, and a rectifying element; a smoothing capacitor connected to an output terminal of the interleave converter; and a controller configured to turn on/off the switching elements of the converters and thereby control power to be outputted from the interleave converter. The controller has a pulse generator configured to generate pulse signals according to an input voltage to the interleave converter and an output voltage from the interleave converter, the pulse signals being used to turn on/off the switching elements, respectively; and an adjuster configured to adjust a duty ratio of each pulse signal so as to extend an OFF time of each switching element, the adjusted duty ratio being used to turn on/off each switching element.

According to the first and second aspects, the adjuster masks an ON time of a pulse signal from the pulse generator for a predetermined time, thereby providing the pulse signal with an adjusted ON time. The controller turns on/off the switching element according to a duty ratio corresponding to the adjusted ON time. The power conversion apparatus of the first and second aspects is manufacturable at low cost, has high functions, and is capable of conducting an appropriate switching operation without auxiliary windings even when a difference between input and output voltages is small and a voltage detection error causes a great variation in an OFF time of the switching element.

According to the third and fourth aspects, the adjuster adjusts a duty ratio of a pulse signal from the pulse generator so as to extend an OFF time of the switching element. The controller turns on/off the switching element according to the adjusted duty ratio. The power conversion apparatus of the third and fourth aspects is manufacturable at low cost, has high functions, and is capable of conducting an appropriate switching operation without auxiliary windings even when a difference between input and output voltages is small and a voltage detection error causes a great variation in an OFF time of the switching element.

DESCRIPTION OF THE PREFERRED EMBODIMENTS

Power conversion apparatuses and controllers for them according to embodiments of the present invention will be explained in detail with reference to the drawings.

Embodiment 1

Figure 1:
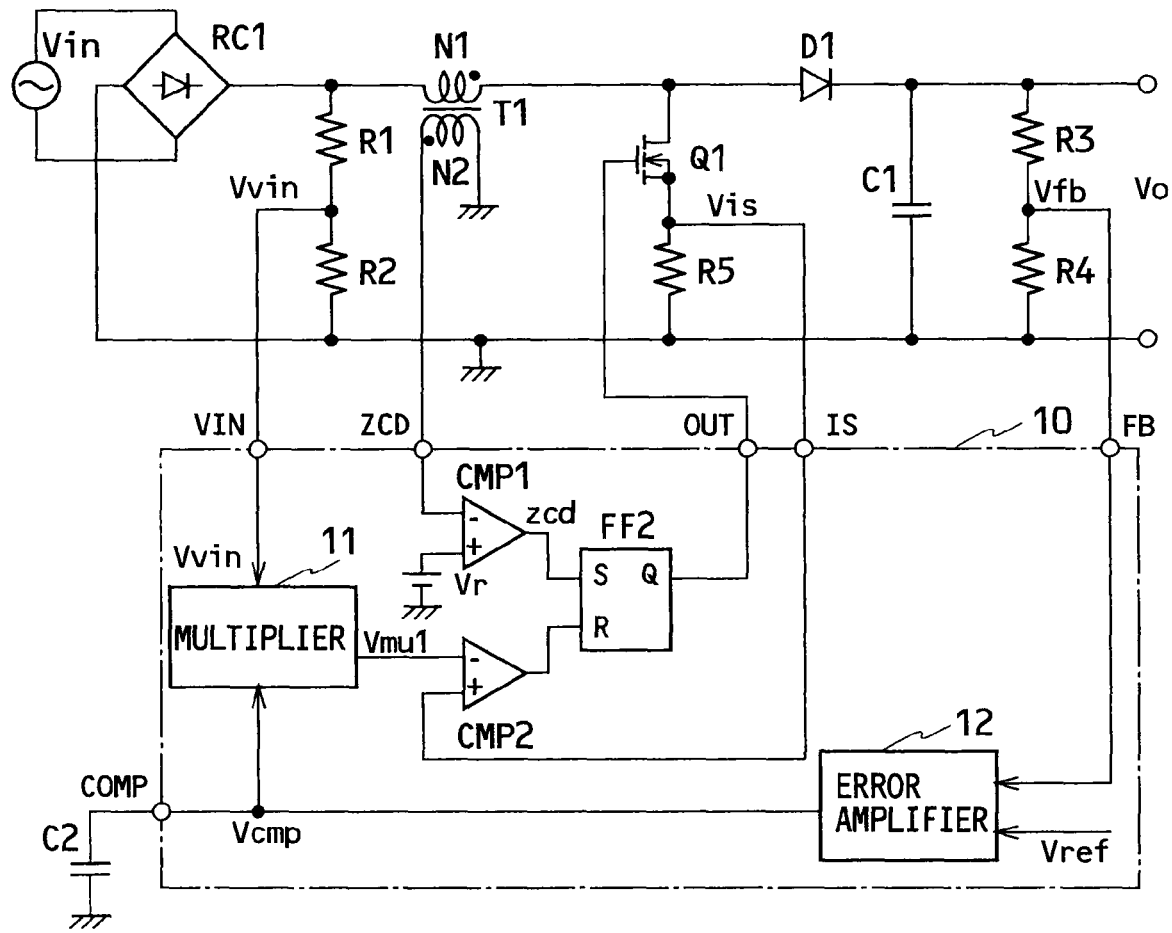
FIG. 1 is a circuit diagram illustrating a power conversion apparatus according to a related art.
Figure 2:
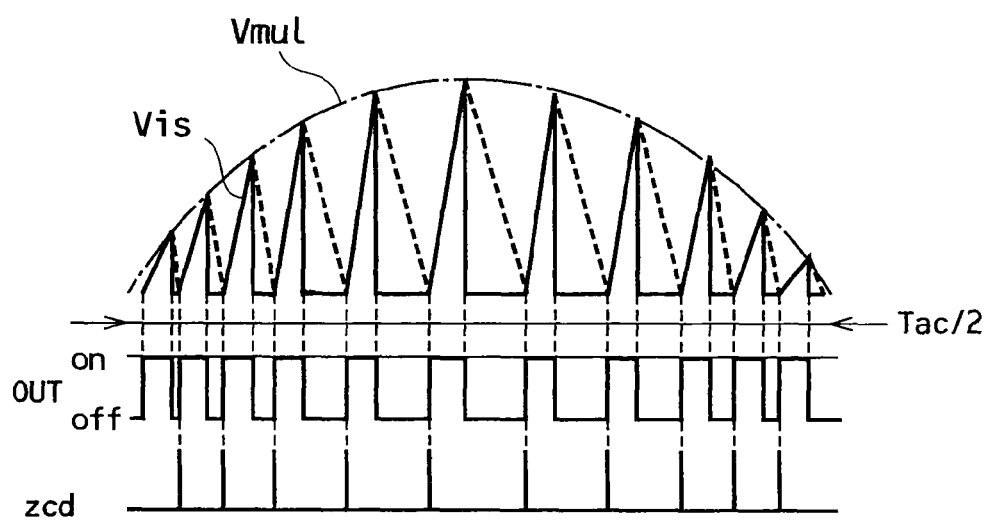
FIG. 2 is a waveform diagram illustrating operating waveforms at various parts of the power conversion apparatus of FIG. 1.
Figure 3:
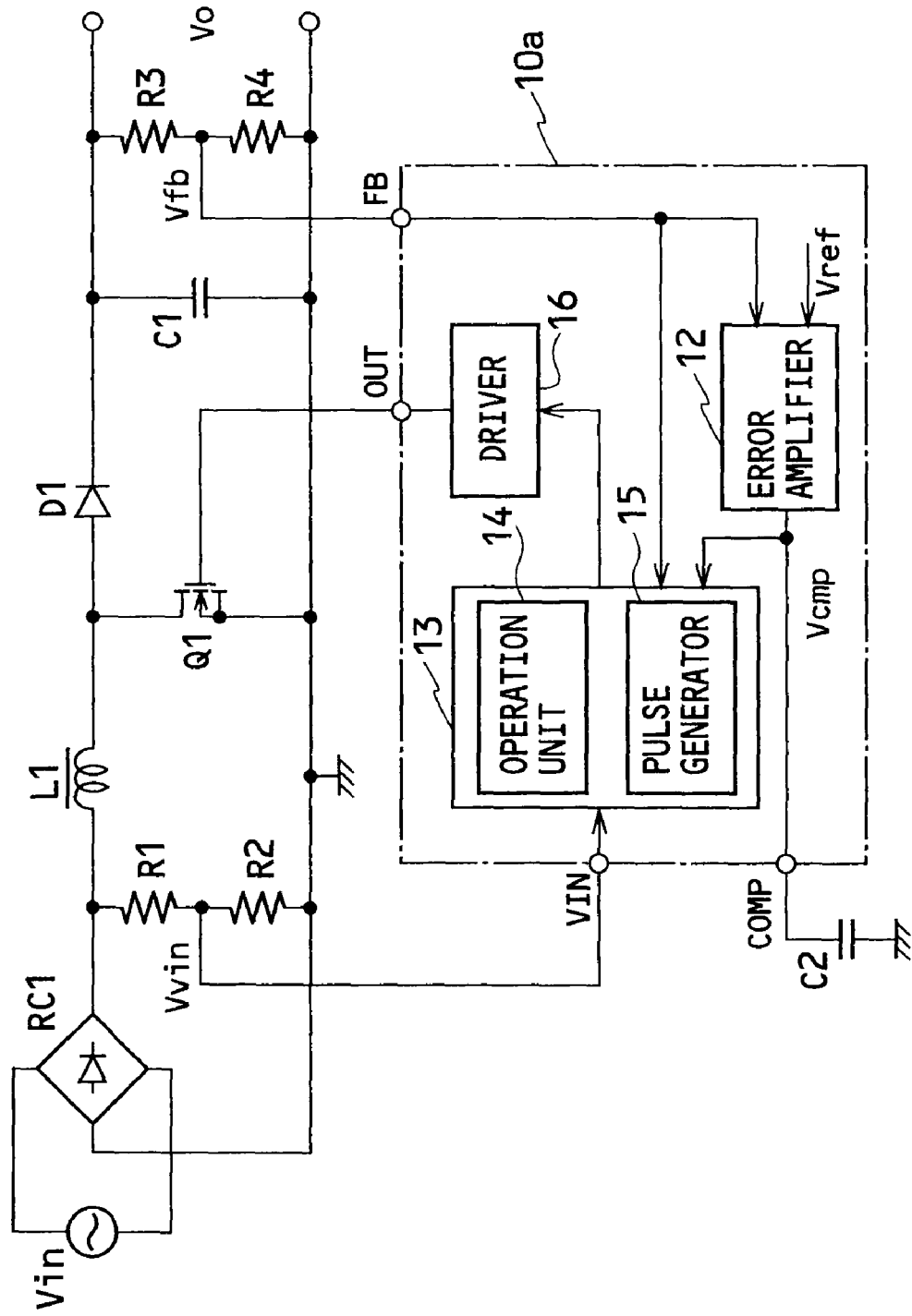
FIG. 3 is a circuit diagram illustrating a power conversion apparatus according to Embodiment 1 of the present invention.

FIG. 3 is a circuit diagram illustrating a power conversion apparatus according to Embodiment 1 of the present invention. In this power conversion apparatus, a rectifier RC1 rectifies an AC voltage from an AC power source Vin into a DC voltage. Both output ends of the rectifier RC1 are connected to a series circuit including a step-up reactor L1 and a switching element Q1 made of a MOSFET and to a series circuit including resistors R1 and R2.

Both ends of the switching element Q1 are connected to a rectifying-smoothing circuit including a rectifier D1 and a smoothing capacitor C1. Both ends of the smoothing capacitor C1 are connected to a series circuit including resistors R3 and R4.

The resistors R1 and R2 constitute an input voltage detector that divides an output voltage from the rectifier RC1 at a connection point of the resistors R1 and R2 and provides an input voltage signal Vvin. The resistors R3 and R4 constitute an output voltage detector that divides a voltage across the smoothing capacitor C1 at a connection point of the resistors R3 and R4 and provides an output voltage signal Vfb.

A controller 10a includes an error amplifier 12, an oscillator 13, and a driver 16. The oscillator 13 includes an operation unit 14 and a pulse generator 15. The error amplifier 12 amplifies an error between the output voltage signal Vfb and a reference voltage Vref and outputs an amplified error signal Vcmp. The oscillator 13 generates a pulse string signal according to the input voltage signal Vvin, output voltage signal Vfb, and amplified error signal Vcmp. The driver 16 drives the switching element Q1 according to the pulse string signal from the oscillator 13.

Figure 4:
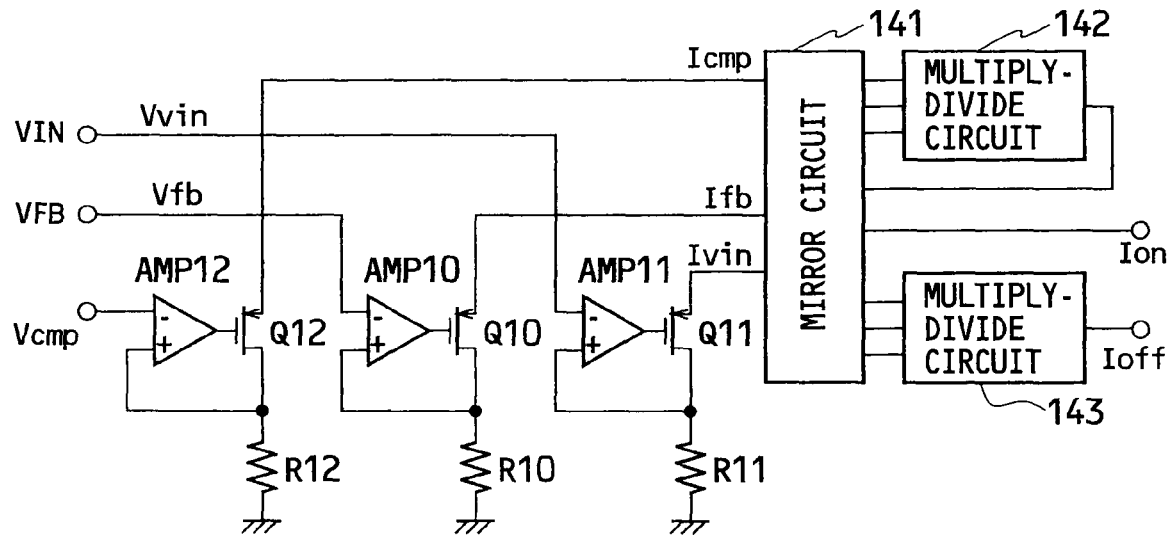
FIG. 4 is a circuit diagram illustrating an operation unit of the power conversion apparatus of FIG. 3.

FIG. 4 is a circuit diagram illustrating the operation unit 14 of the power conversion apparatus according to Embodiment 1. In FIG. 4, an operational amplifier AMP10 has an inverting input terminal connected to a terminal VFB for receiving the output voltage signal Vfb, a non-inverting input terminal connected to a drain of a MOSFET Q10 and a first end of a resistor R10, and an output terminal connected to a gate of the MOSFET Q10. A source of the MOSFET Q10 is connected to a mirror circuit 141, to form a voltage-controlled current source. The operational amplifier AMP10, resistor R10, and MOSFET Q10 constitute a voltage-current conversion circuit to convert the output voltage signal Vfb into a current signal Ifb, which is supplied to the mirror circuit 141.

An operational amplifier AMP11 has an inverting input terminal connected to a terminal VIN for receiving the input voltage signal Vvin, a non-inverting input terminal connected to a drain of a MOSFET Q11 and a first end of a resistor R11, and an output terminal connected to a gate of the MOSFET Q11. A source of the MOSFET Q11 is connected to the mirror circuit 141. The operational amplifier AMP11, resistor R11, and MOSFET Q11 constitute a voltage-current conversion circuit to convert the input voltage signal Vvin into a current signal Ivin, which is supplied to the mirror circuit 141.

An operational amplifier AMP12 has an inverting input terminal connected to a terminal Vcmp for receiving the amplified error signal Vcmp, a non-inverting input terminal connected to a drain of a MOSFET Q12 and a first end of a resistor R12, and an output terminal connected to a gate of the MOSFET Q12. A source of the MOSFET Q12 is connected to the mirror circuit 141. The operational amplifier AMP12, resistor R12, and MOSFET Q12 constitute a voltage-current conversion circuit to convert the amplified error signal Vcmp which is a voltage signal into a current error signal Icmp, which is supplied to the mirror circuit 141.

The mirror circuit 141 converts the current signals Ifb, Ivin, and Icmp from the three voltage-current conversion circuits into signals of required levels. Multiply-divide circuits 142 and 143 carry out multiplication and division on the current signals from the mirror circuit 141 and provide an ON-time signal Ion and an OFF-time signal Ioff as output signals from the operation unit 14. The signals Ion and Ioff are supplied to the pulse generator 15.

Figure 5:
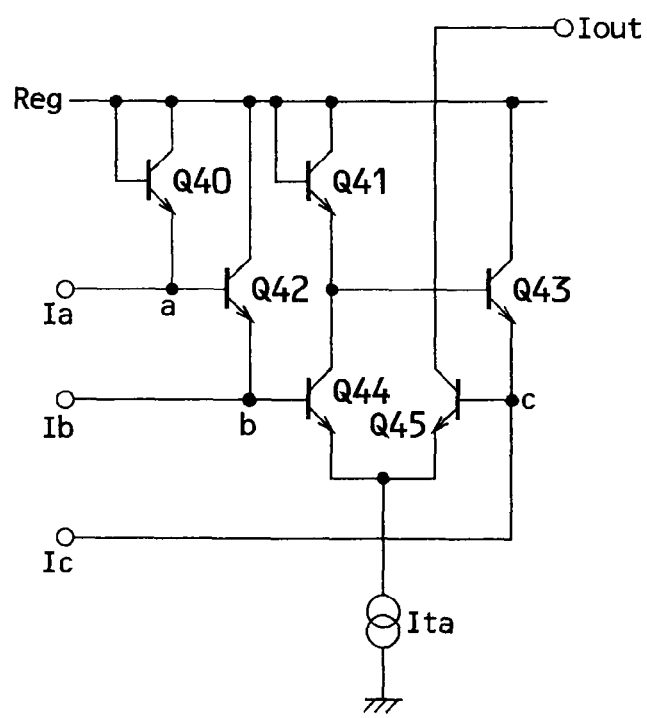
FIG. 5 is a circuit diagram illustrating a multiply-divide circuit in the operation unit of FIG. 4.

FIG. 5 is a circuit diagram illustrating the multiply-divide circuit 142 (143) of the operation unit 14. In the multiply-divide circuit 142 (143), a power source Reg is connected to collectors of transistors Q40, Q41, Q42, and Q43 and bases of the transistors Q40 and Q41. A connection point between an emitter of the transistor Q40 and a base of the transistor Q42 as depicted by "a" serves as an input terminal. A connection point between an emitter of the transistor Q42 and a base of a transistor Q44 as depicted by "b" serves as an input terminal. A connection point between an emitter of the transistor Q43 and a base of a transistor Q45 as depicted by "c" serves as an input terminal.

An emitter of the transistor Q41 is connected to a collector of the transistor Q44 and a base of the transistor Q43. An emitter of the transistor Q44 is connected to an emitter of the transistor Q45 and a current source Ita. A collector of the transistor Q45 serves as an output terminal. According to currents Ia, Ib, and Ic passing through the input terminals a, b, and c, the value of an output current Iout of the multiply-divide circuit 142 (143) changes. In the multiply-divide circuit 142 (143) illustrated in FIG. 5, the value of the output current Iout is equal to a result of Ia×Ib/Ic and is equal to or lower than the current value of the current source Ita.

Figure 6:
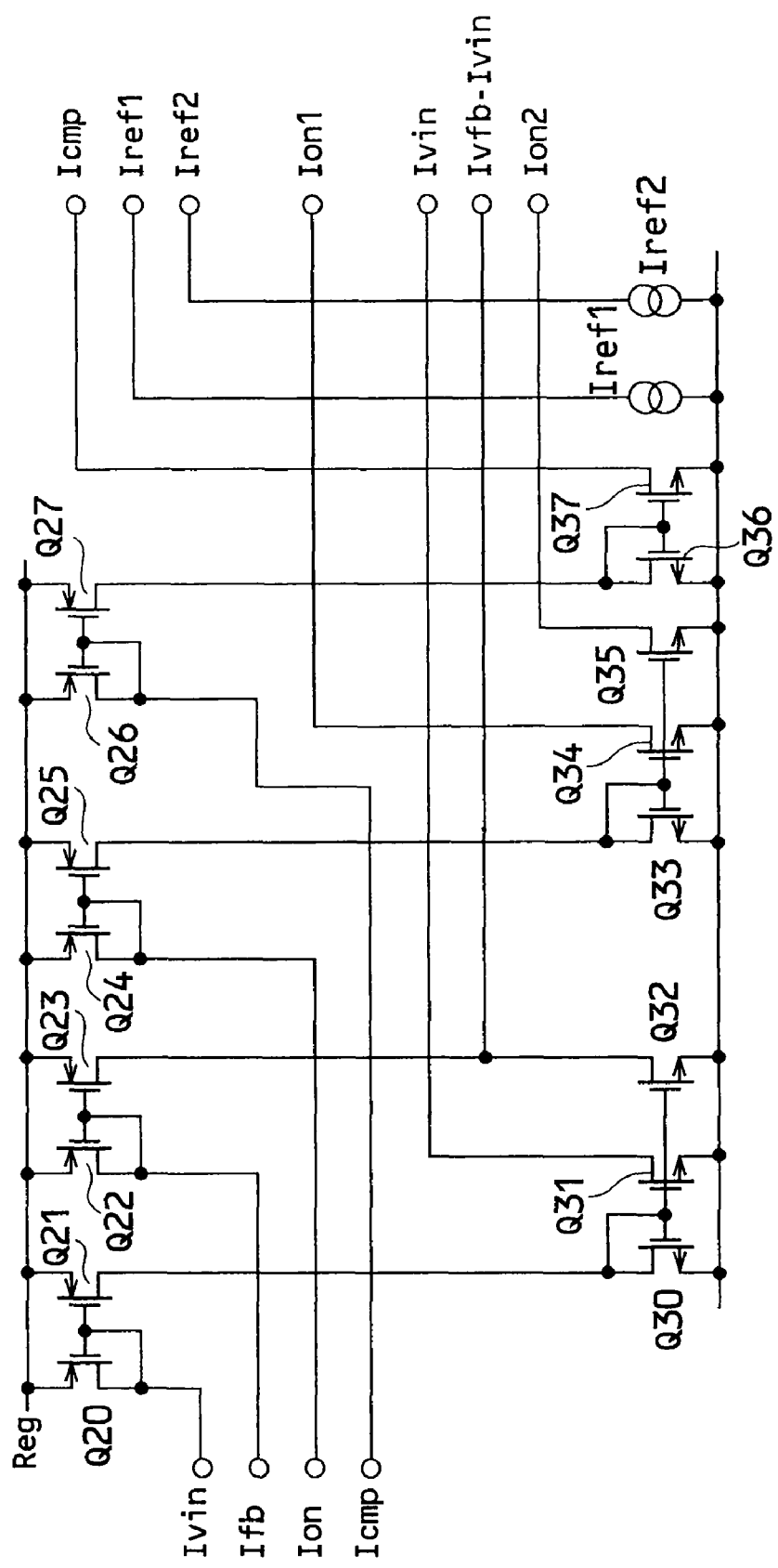
FIG. 6 is a circuit diagram illustrating a mirror circuit of the operation unit of FIG. 4.

FIG. 6 is a circuit diagram illustrating the mirror circuit 141 in the operation unit 14 according to Embodiment 1. The mirror circuit 141 is a current mirror circuit consisting of MOSFETs. The mirror circuit 141 receives the current signals Ivin, Ifb, and Icmp from the voltage-current conversion circuits and an operation result Ion from the multiply-divide circuit 143 and shapes signal levels appropriate for the multiply-divide circuit 143.

The MOSFETs Q20, Q21, Q30, and Q31 shape the current signal Ivin for the multiply-divide circuit 143. The MOSFETs Q22, Q23, and Q32 subtracts Ivin from the current signal Ifb and shape the difference for the multiply-divide circuit 143. The MOSFETs Q26, Q27, Q36, and Q37 shape the current signal Icmp for the multiply-divide circuit 143. The MOSFETs Q24, Q25, Q33, Q34, and Q35 shape the operation result Ion for the multiply-divide circuit 143 and provide operation results Ion1 and Ion2.

In the oscillator 13, the multiply-divide circuit 142 and mirror circuit 141 generate an ON-time signal Ion that is inversely proportional to the amplified error signal Vcmp and the multiply-divide circuit 143 and mirror circuit 141 generate an OFF-time signal Ioff according to the input voltage signal Vvin, output voltage signal Vfb, and ON-time signal Ion.

Figure 7:
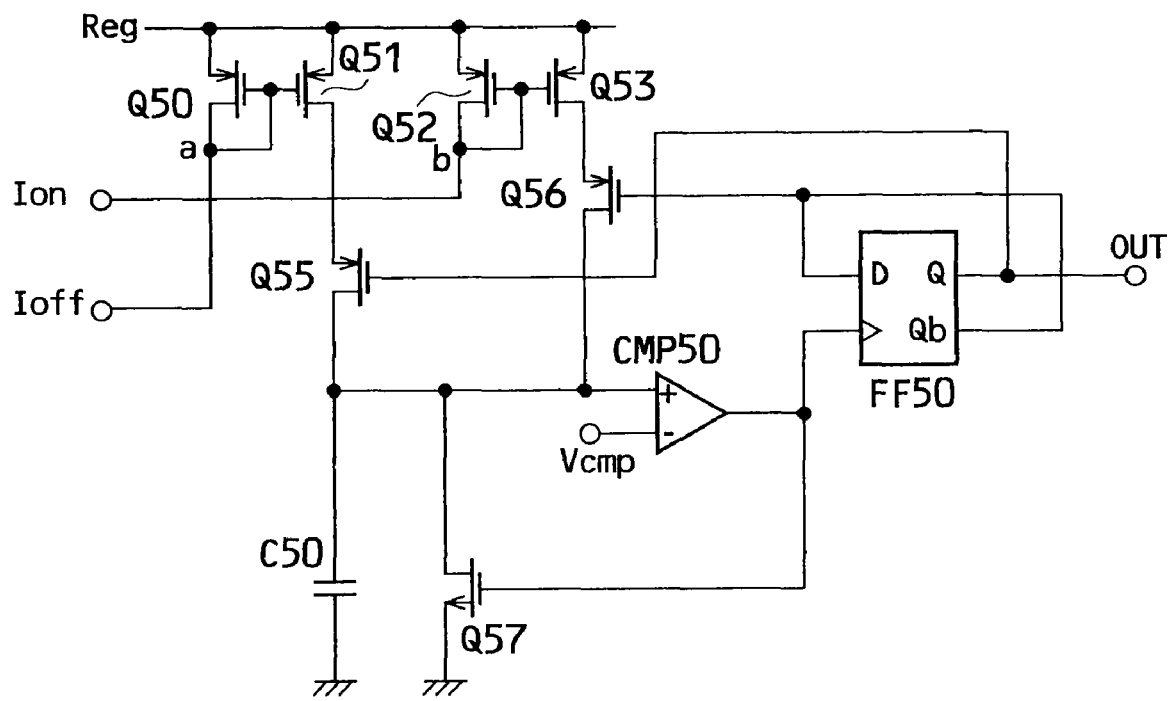
FIG. 7 is a circuit diagram illustrating a pulse generator of the power conversion apparatus of FIG. 3.

FIG. 7 is a circuit diagram illustrating the pulse generator 15 of the power conversion apparatus according to Embodiment 1. The pulse generator 15 generates a pulse string signal according to the ON-time signal Ion, OFF-time signal Ioff, and amplified error signal Vcmp.

In FIG. 7, the power source Reg is connected to sources of MOSFETs Q50, Q51, Q52, and Q53. A connection point between a gate and drain of the MOSFET Q50 and a gate of the MOSFET Q51 as depicted by "a" serves as an input terminal to pass the OFF-time signal Ioff from the operation unit 14. A connection point between a gate and drain of the MOSFET Q52 and a gate of the MOSFET Q53 as depicted by "b" serves as an input terminal to pass the ON-time signal Ion from the operation unit 14.

A drain of the MOSFET Q51 is connected to a source of a MOSFET Q55. A drain of the MOSFET Q55 is connected to a first end of an oscillation capacitor C50, a drain of a MOSFET Q57, a non-inverting input terminal of a comparator CMP50, and a drain of a MOSFET 56. A second end of the oscillation capacitor C50 and a drain of the MOSFET Q57 are grounded. A source of the MOSFET Q56 is connected to a drain of the MOSFET Q53.

An inverting input terminal of the comparator CMP50 receives the amplified error signal Vcmp and an output terminal of the comparator CMP50 is connected to a gate of the MOSFET Q57 and a trigger terminal of a D-flip-flop FF50. A gate of the MOSFET Q56 is connected to an input terminal D and inverting output terminal Qb of the D-flip-flop FF50. A gate of the MOSFET Q55 is connected to an output terminal Q of the D-flip-flop FF50. The output terminal Q of the D-flip-flop FF50 provides an output OUT.

If the D-flip-flop FF50 is in a set state, the output Q thereof is high and the inverting output Qb thereof is low. At this time, the MOSFET Q55 is in an OFF state and the MOSFET Q56 in an ON state. The MOSFET Q56 supplies the ON-time signal Ion through a mirror circuit including the MOSFETs Q52 and Q53 to the oscillation capacitor C50, thereby charging the oscillation capacitor C50.

When a voltage across the oscillation capacitor C50 is charged by the ON-time signal Ion up to the amplified error signal Vcmp, the comparator CMP50 outputs a high-level signal as a clock pulse to the D-flip-flop FF50. At this time, the oscillation capacitor C50 discharges. Receiving the clock pulse, the D-flip-flop FF50 in the set state changes to a reset state. Then, the output Q of the D-flip-flop FF50 becomes low and the inverting output Qb thereof becomes high, to turn on the MOSFET Q55 and off the MOSFET Q56.

The MOSFET Q55 supplies the OFF-time signal Ioff through a mirror circuit including the MOSFETs Q50 and Q51 to the oscillation capacitor C50, thereby charging the oscillation capacitor C50. When a voltage across the oscillation capacitor C50 is charged by the OFF-time signal Ioff up to the amplified error signal Vcmp, the comparator CMP50 outputs a high-level signal as a clock pulse to the D-flip-flop FF50. At this time, the oscillation capacitor C50 discharges. Receiving the clock pulse, the D-flip-flop FF50 in the reset state changes to a set state.

The above-mentioned operation is repeated so that the pulse generator 15 generates a pulse string signal according to the ON-time signal Ion, OFF-time signal Ioff, and amplified error signal Vcmp. The pulse generator 15 charges the oscillation capacitor C50 with a current, and according to a time in which the voltage of the oscillation capacitor C50 reaches a predetermined voltage, generates a pulse string. This operation is expressed as follows:

$$Vcmp = \frac{Ion \cdot Ton}{C50} = \frac{Ioff \cdot Toff}{C50}. \tag{1}$$

In the step-up power factor correction converter illustrated in FIG. 3, an ON time Ton of the switching element Q1 changes in proportion to only the amplified error signal Vcmp without regard to changes in the input voltage Vin and output voltage Vo and an OFF time Toff of the switching element Q1 changes in proportion to the input voltage Vin, output voltage Vo, and the ON time of the switching element Q1. A relationship between the ON time Ton and OFF time Toff of the switching element Q1 is expressed as follows:

$$Toff \geq \frac{Vin}{Vo - Vin} \cdot Ton. \tag{2}$$

According to the expressions (1) and (2), a relationship between the ON-time signal Ion and the OFF-time signal Ioff is expressed as follows:

$$Ioff = \frac{Vo - Vin}{Vin} \cdot Ion. \tag{3}$$

Figure 8:
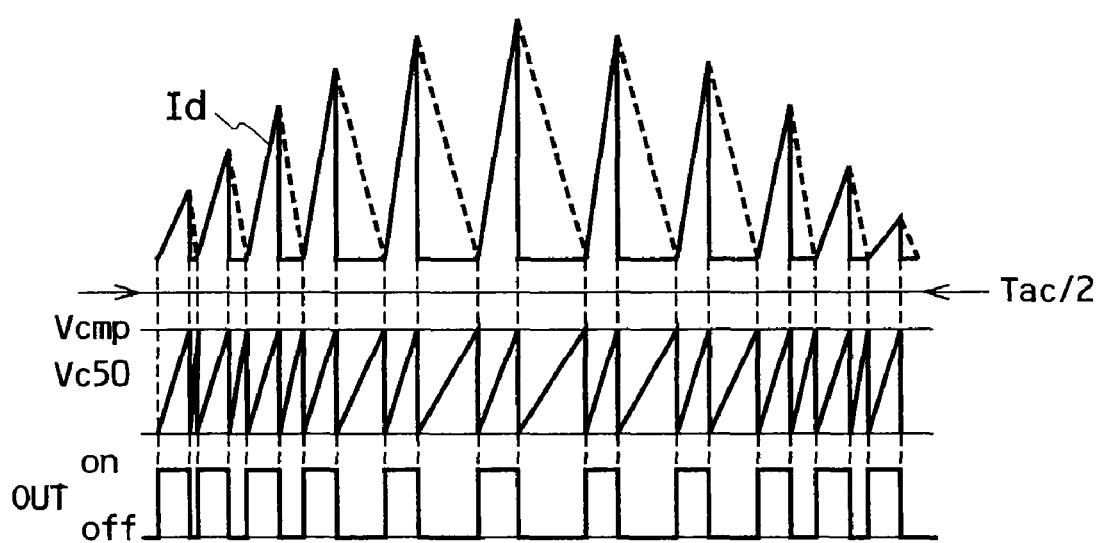
FIG. 8 is a waveform diagram illustrating operating waveforms at various parts of the power conversion apparatus of FIG. 3.

The operation unit 14 illustrated in FIG. 4 uses the mirror circuit 141 and multiply-divide circuit 143, to shape signals according to the expression (3) and provide the OFF-time signal Ioff. Accordingly, the pulse string signal generated by the pulse generator 15 can optimize a duty ratio of the ON time Ton and OFF time Toff of the switching element Q1 in the step-up power factor correction converter. FIG. 8 is a waveform diagram illustrating waveforms at various parts of the power conversion apparatus according to Embodiment 1 of the present invention.

The power conversion apparatus of Embodiment 1 with the above-mentioned configuration creates OFF timing of the switching element Q1 in an IC, and therefore, requires no winding to detect a current passing through the step-up reactor L1.

Embodiment 2

A power conversion apparatus according to Embodiment 2 of the present invention will be explained. The power conversion apparatus of Embodiment 1 will deteriorate power factor and efficiency or excessively decrease a switching frequency lower than an audible frequency, if the input voltage signal Vvin and output voltage signal Vfb are incorrectly measured.

If the output voltage Vo is 385 V and the input voltage Vin is 100 V, the OFF time Toff of the switching element Q1 will be 0.35 times the ON time Ton of the switching element Q1. At this time, if the input voltage Vin and output voltage Vo are detected with a voltage detection error of ±1%, the OFF time Toff will vary in the range of 0.34 to 0.36 times the ON time Ton. This variation of the OFF time is ignorable.

If the output voltage Vo is 385 V and the input voltage Vin is 375 V, the OFF time Toff will be 37.5 times the ON time Ton. At this time, if the input voltage Vin and output voltage Vo are detected with a voltage detection error of ±1%, the OFF time Toff will vary in the range of 20.09 to 158 times the ON time Ton. This variation of the OFF time is never ignorable. In this way, as the difference between the input voltage Vin and the output voltage Vo decreases, the variation of the OFF time Toff caused by a voltage detection error increases. If the OFF time Toff is erroneously extended, the OFF-to-ON switching timing of the switching element Q1 delays to deteriorate the correctness of the switching operation.

To cope with this problem, the power conversion apparatus according to Embodiment 2 adds an adjust signal to a pulse string signal generated by a controller, to secure a correct switching operation even when the difference between the input voltage Vin and the output voltage Vo is small and a voltage detection error causes a great variation in the OFF time Toff of the switching element Q1. In addition, the power conversion apparatus of Embodiment 2 is manufacturable at low cost and has high functions.

Figure 9:
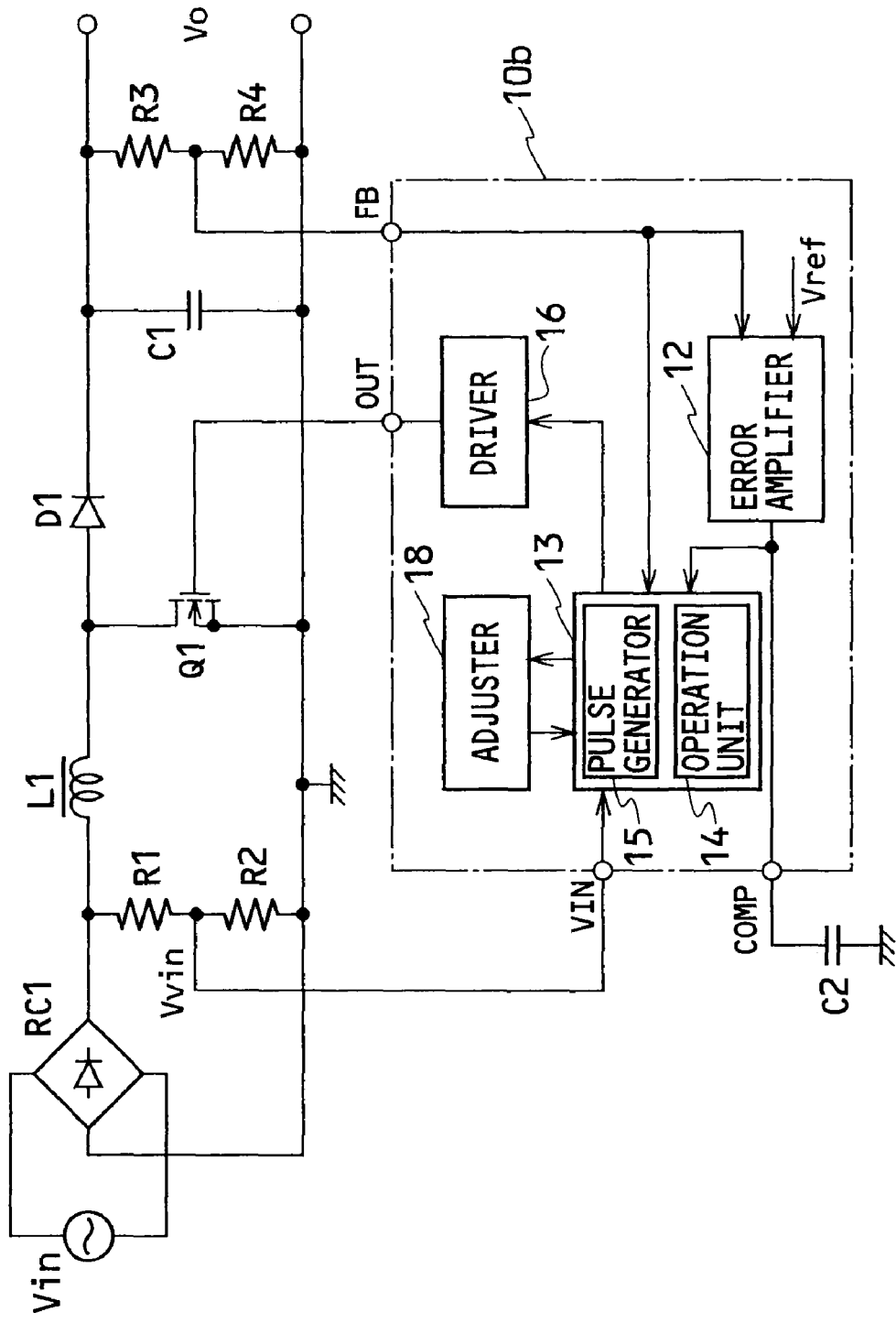
FIG. 9 is a circuit diagram illustrating a power conversion apparatus according to Embodiment 2 of the present invention.

FIG. 9 is a circuit diagram illustrating the power conversion apparatus according to Embodiment 2. In the power conversion apparatus, a controller 10*b* includes an error amplifier 12, an oscillator 13, an adjuster 18, and a driver 16. The oscillator 13 includes an operation unit 14 and a pulse generator 15. Namely, Embodiment 2 differs from Embodiment 1 in that Embodiment 2 additionally employs the adjuster 18.

Figure 10:
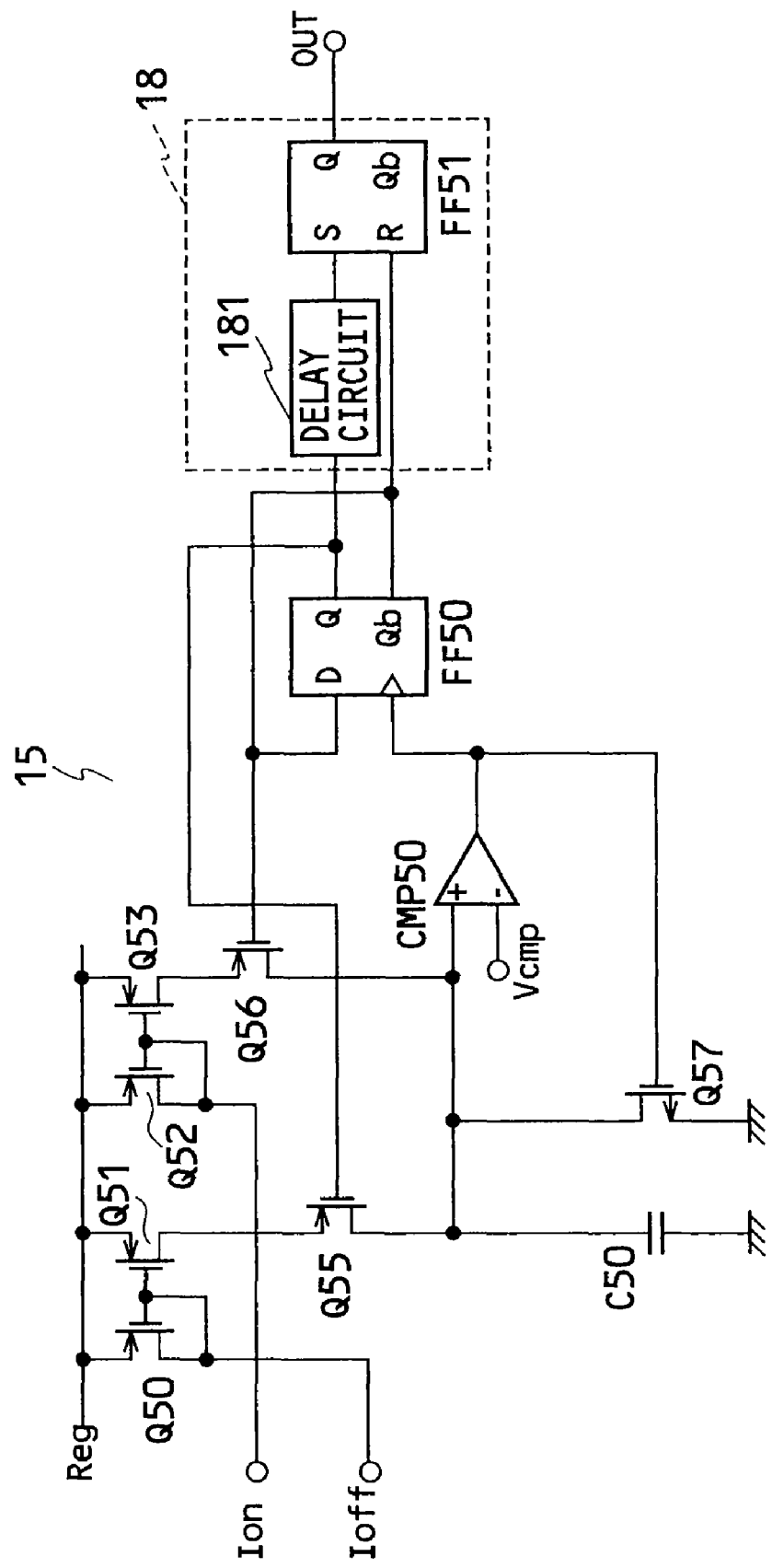
FIG. 10 is a circuit diagram illustrating a pulse generator and an adjuster in the power conversion apparatus of FIG. 9.

FIG. 10 is a circuit diagram illustrating the pulse generator 15 and adjuster 18 in the power conversion apparatus according to Embodiment 2. In FIG. 10, the adjuster 18 is connected to output terminals Q and Qb of a D-flip-flop FF50 in the pulse generator 15. The adjuster 18 includes a delay circuit 181 that delays a signal from the output terminal Q of the D-flip-flop FF50 by a predetermined time and an RS-flip-flop FF51. The RS-flip-flop FF51 is set when receiving at a set terminal S the delayed signal from the delay circuit 181 and is reset when receiving at a reset terminal R a signal from the inverting output terminal Qb of the D-flip-flop FF50. Namely, the adjuster 18 adjusts an ON time of a pulse string signal generated by the pulse generator 15 by masking (thinning) the ON time for the predetermined time.

When the pulse generator 15 outputs a high-level pulse string signal, the delay circuit 181 delays the signal by the predetermined time. The delayed high-level signal sets the RS-flip-flop FF51, and therefore, an output terminal Q of the RS-flip-flop FF51 outputs a high-level signal.

When the pulse string signal from the pulse generator 15 changes to low, the inverting output terminal Qb of the D-flip-flop FF50 outputs a high level signal to the reset terminal R of the RS-flip-flop FF51. Then, the output terminal Q of the RS-flip-flop FF51 outputs a low-level signal. The adjuster 18 repeats this operation. Namely, the adjuster 18 of Embodiment 2 thins an ON time of a pulse string signal generated by the pulse generator 15 by the predetermined time (the delay time of the delay circuit 181). The controller 10*b* turns on/off a switching element Q1 at a duty ratio determined by the adjusted ON time provided by the adjuster 18.

When the power conversion apparatus of FIG. 9 changes an input voltage to supply power to a load, the adjuster 18 changes the predetermined time according to an increase in the input voltage (i.e., proportional to the input voltage), to shorten an ON time of the switching element Q1.

Embodiment 2 thins the ON time Ton of the switching element Q1 by a predetermined time. Accordingly, as the ON time becomes shorter, the ratio of the thinned portion of the ON time to the whole ON time becomes larger.

On the other hand, a period of the pulse string signal generated by the pulse generator 15 is unchanged. Accordingly, thinning the ON time Ton of the switching element Q1 results in apparently extending the OFF time Toff of the switching element Q1. Even if the OFF time Toff greatly varies due to a voltage detection error, Embodiment 2 is capable of preventing the OFF time Toff from becoming shorter than a theoretical value (the OFF time provided by the operation unit 14).

Figure 11A:
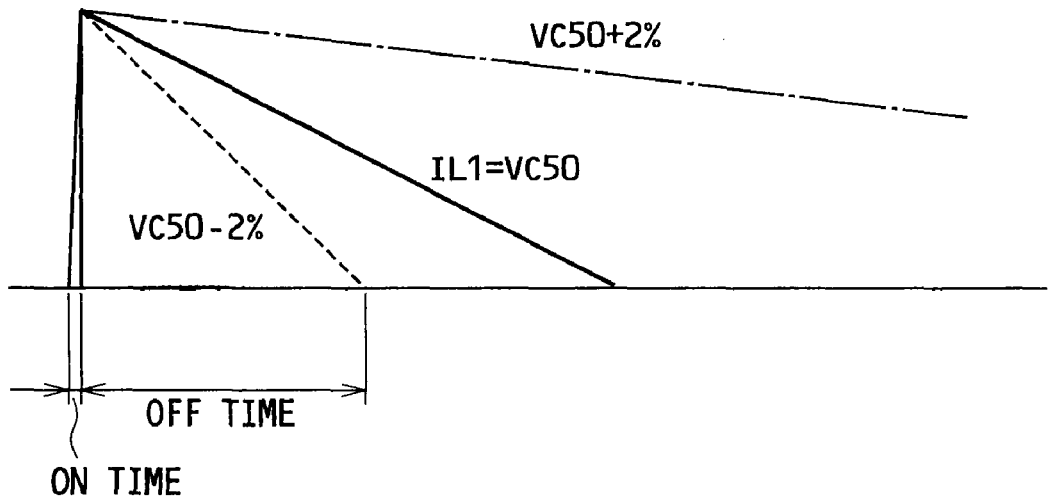
FIGS. 11A and 11B are waveform diagrams illustrating operating waveforms at various parts of the power conversion apparatus of FIG. 9.

FIG. 11A is a view illustrating the influence of a voltage detection error when the difference between the input voltage Vin and the output voltage Vo is small. In FIG. 11A, a current IL1 passing through a step-up reactor L1 and a voltage across an oscillation capacitor C50 involve different detection errors. In FIG. 11A, a waveform of the oscillation capacitor C50 when the difference between the input voltage Vin and the output voltage Vo is detected larger than an actual value is depicted by "VC50−2%". A waveform of the oscillation capacitor C50 when the difference between the input voltage Vin and the output voltage Vo is detected smaller than an actual value is depicted by "VC50+2%".

The waveform of "VC50−2%" indicates that the OFF time Toff of the switching element Q1 ends before the actual reactor current IL1 becomes zero. The waveform of "VC50+2%" indicates that the OFF time Toff continues for a long time after the reactor current IL1 becomes zero.

Figure 11B:
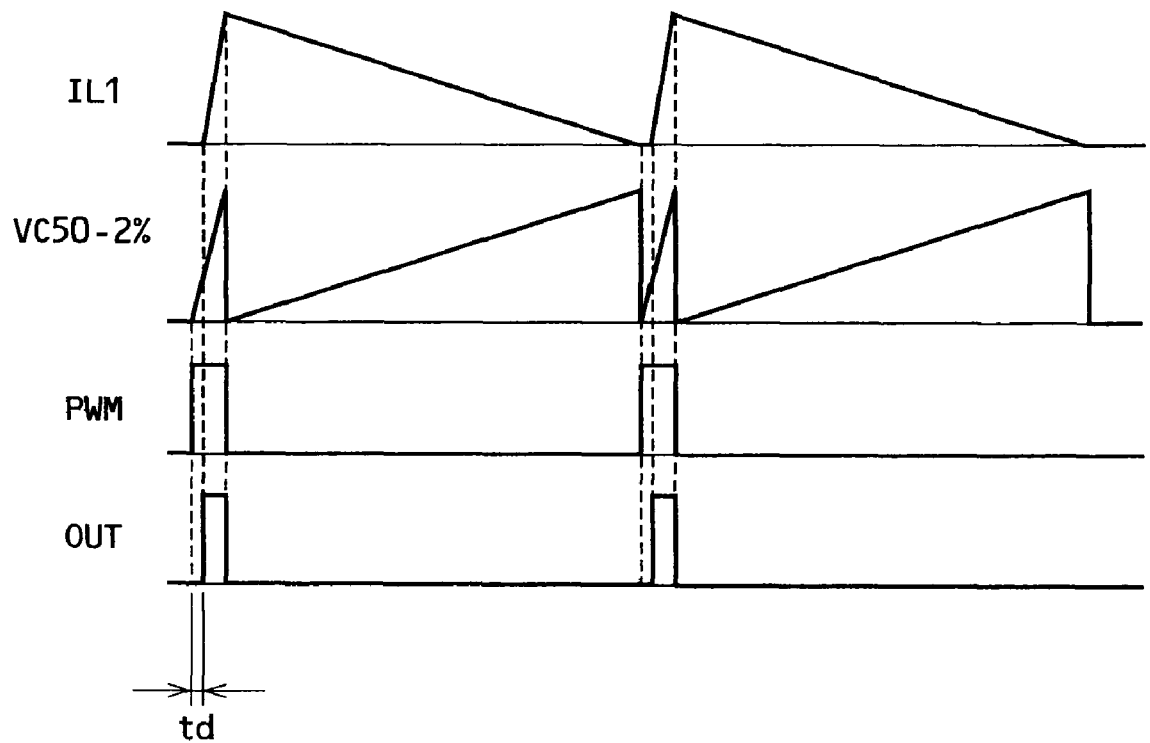

FIG. 11B illustrates waveforms with the adjuster 18. The waveforms of FIG. 11B include the current IL1 of the step-up reactor L1, the voltage VC50 across the oscillation capacitor C50, an output PWM from the D-flip-flop FF50, and an output OUT from the RS-flip-flop FF51 that is formed by delaying the output PWM by a predetermined time td. It is supposed that the voltage detector involves a detection error that detects the OFF time Toff shorter than an actual value.

In connection with the ON time Ton, an output pulse width from the adjuster 18 is substantially constant without regard to an error in the voltage detector or the presence of the adjuster 18. This is to obtain predetermined power. On the other hand, the OFF time Toff includes an OFF time corresponding to a thinned portion of the ON time thinned by the adjuster 18.

When the ratio of the ON time is large, a time period substantially equal to the thinned portion of the ON time thinned by the adjuster 18 is added to the OFF time Toff. When the ratio of the ON time is small, a time period several times as large as the thinned portion of the ON time thinned by the adjuster 18 is added to the OFF time Toff.

Embodiment 3

Figure 12:
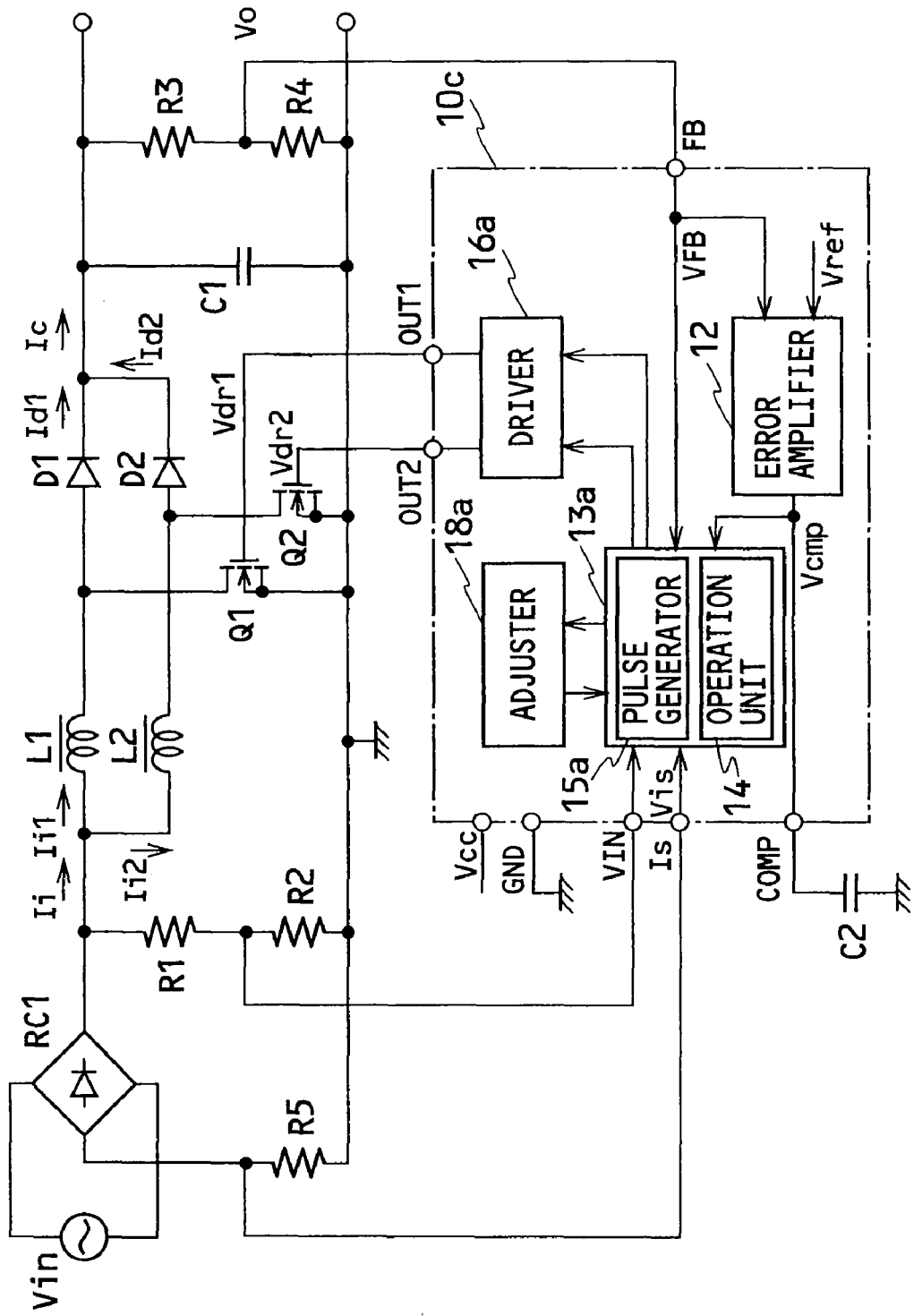
FIG. 12 is a circuit diagram illustrating a power conversion apparatus according to Embodiment 3 of the present invention.

FIG. 12 is a circuit diagram illustrating a power conversion apparatus according to Embodiment 3 of the present invention. Embodiment 3 differs from Embodiment 2 in that Embodiment 3 employs an interleave converter configuration including first and second converters connected in parallel. The first converter has a step-up reactor L1, a switching element Q1, and a diode D1. The second converter has a step-up reactor L2, a switching element Q2, and a diode D2.

An input current sensing resistor R5 as a current sensor is connected to the interleave converter and a negative terminal of a rectifier RC1, to detect and provide an input current signal Vis, which is supplied to an oscillator 13a in a controller 10c.

The oscillator 13a provides first and second drive signals according to which a driver 16a turns on/off the switching elements Q1 and Q2.

Figure 13:
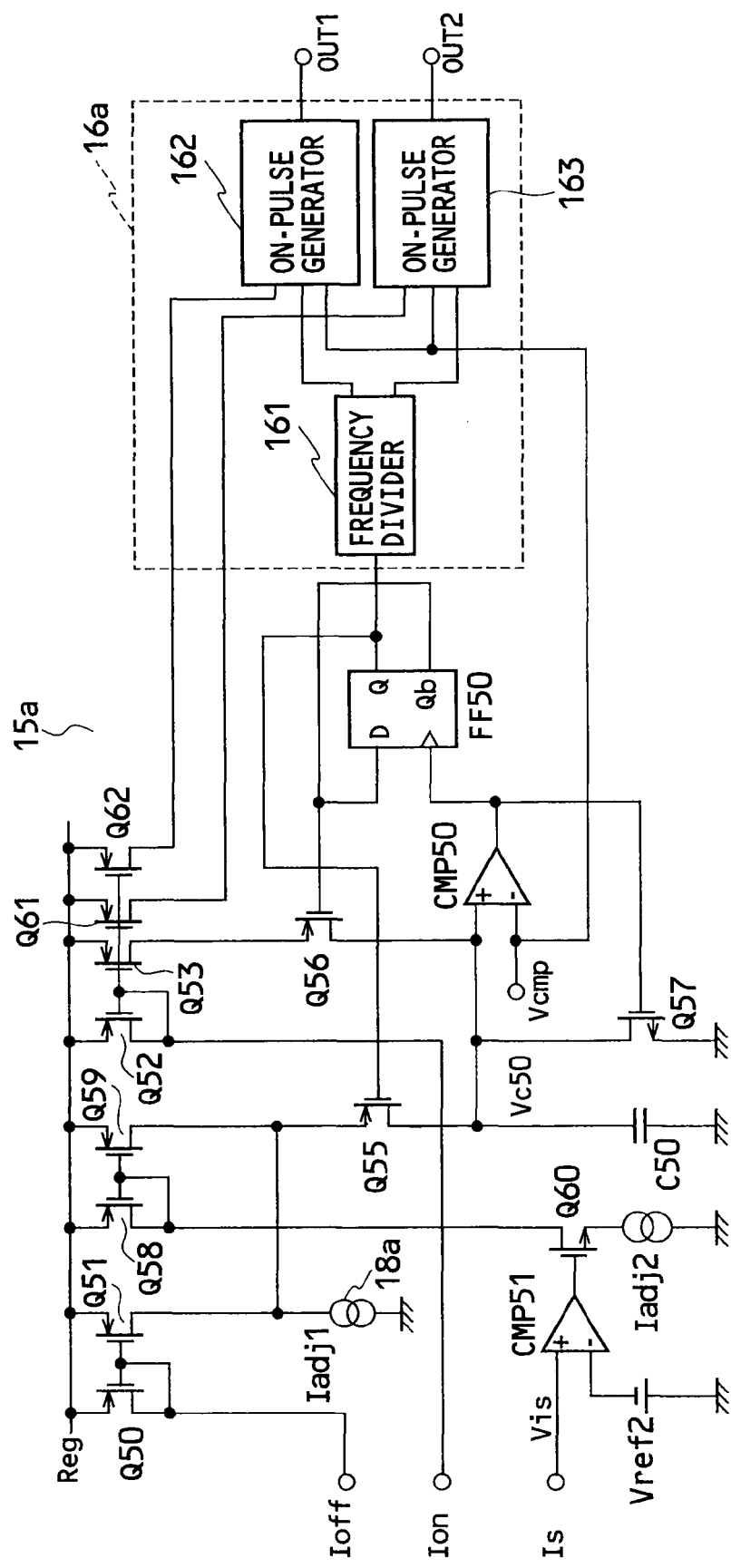
FIG. 13 is a circuit diagram illustrating a pulse generator and a driver of the power conversion apparatus of FIG. 12.

FIG. 13 is a circuit diagram illustrating a pulse generator 15a and the driver 16a in the power conversion apparatus according to the present embodiment. Compared with the pulse generator 15 illustrated in FIG. 10, the pulse generator 15a additionally has MOSFETs Q58 and Q59 that form a mirror circuit, MOSFETs Q61 and Q62 that form a mirror circuit with MOSFETs Q52 and Q53, a current source for providing a first adjustive current Iadj1, a reference power source Vref2, a comparator CMP51, a MOSFET Q60, and a current source for providing a second adjustive current Iadj2. The current source for providing the first adjustive current Iadj1 corresponds to an adjuster 18a.

The current source for passing the first adjustive current Iadj1 is connected to drains of the MOSFETs Q51 and Q59, to adjust an OFF-time signal Toff so as to extend the ratio of an OFF time of the switching elements Q1 and Q2 with respect to a duty ratio of a pulse string signal provided by an operation unit 14. The comparator CMP51 compares a voltage corresponding to the input current signal Vis with a voltage of the reference power source Vref2. If Vis is equal to or lower than Vref2, i.e., if a decrease in the input current signal Vis is detected, the MOSFET Q60 connected to a drain of the MOSFET Q58 is turned on to add the second adjustive current Iadj2 to the OFF-time signal Ioff. The reference power source Vref2, comparator CMP51, MOSFET Q60, and current source for passing the second adjustive current Iadj2 constitute a current starvation corrector.

The pulse generator 15a is connected to the driver 16a that includes a frequency divider 161 and ON-pulse generators 162 and 163. The frequency divider 161 divides the frequency of a pulse string signal generated by a D-flip-flop FF50 and creates first and second trigger signals having a phase difference of 180 degrees. The ON-pulse generator 162 receives the first trigger signal from the frequency divider 161, an ON-time signal Ion from the MOSFET Q62, and an amplified error signal Vcmp and generates an ON pulse, which is supplied to a gate of the switching element Q1. The ON-pulse generator 163 receives the second trigger signal from the frequency divider 161, the ON-time signal Ion from the MOSFET Q61, and the amplified error signal Vcmp and generates an ON pulse, which is supplied to a gate of the switching element Q2.

The ON-pulse generators 162 and 163 correspond to a pulse generator for generating pulse strings for controlling the interleave converter and have a risk of affected by a voltage detection error like the power conversion apparatus of Embodiment 1.

To cope with this risk, Embodiment 3 subtracts the first adjustive current Iadj1 from the OFF-time signal Ioff. With the first adjustive current Iadj1, the expression 3 is written as follows:

$$Ioff = \frac{Vo - Vin}{Vin} \cdot Ion - Iadj1. \qquad (4)$$

If the difference between the input voltage Vin and the output voltage Vo is large, the OFF-time signal Ioff will be large, and therefore, the proportion of the first adjustive current Iadj1 in the OFF-time signal Ioff is small. If the difference between the input voltage Vin and the output voltage Vo is small, the OFF-time signal Ioff will be small to increase the influence of the first adjustive current Iadj1 on the OFF-time signal Ioff. Namely, adding the first adjustive current Iadj1 to the OFF-time signal Ioff results in realizing a characteristic similar to thinning an ON time of a pulse string signal by a predetermined time of Embodiment 2.

In this way, the present embodiment subtracts a predetermined current from the OFF time signal Ioff, to avoid the problem that the OFF time Toff of the switching elements Q1 and Q2 is shortened from a predetermined time due to a detection error in the input voltage Vin and output voltage Vo.

The above-mentioned adjustment is effective when the OFF time Toff of the switching elements Q1 and Q2 is shorter than an OFF time provided by the operation unit 14. If the OFF time Toff of the switching elements Q1 and Q2 is longer than an OFF time provided by the operation unit 14, the ON timing of the switching elements Q1 and Q2 is greatly delayed in the next cycle.

To solve this problem, Embodiment 3 employs the comparator COMP51 to compare a voltage corresponding to the input current signal Vis from the current sensing resistor R5 with the voltage of the reference power source Vref2. If Vis is equal to or lower than Vref2, the present embodiment adds the second adjustive current Iadj2 to the OFF-time signal Ioff, to shorten the OFF time of the switching elements Q1 and Q2.

If the input voltage Vin and output voltage Vo are correctly detected, or if the interleave converter properly conducts switching operation, or if the difference between the input voltage Vin and the output voltage Vo is large, the current sensing resistor R5 detects a resultant current of input currents to the two converters having different phases, and therefore, the comparator CMP51 becomes inactive.

If the difference between the input voltage Vin and the output voltage Vo becomes small to decrease an accuracy of the OFF-time signal Ioff and elongate the OFF time, a large difference occurs in duty ratio between currents to the step-up reactors L1 and L2 and pulse strings generated by the oscillator 13a.

Figure 14:
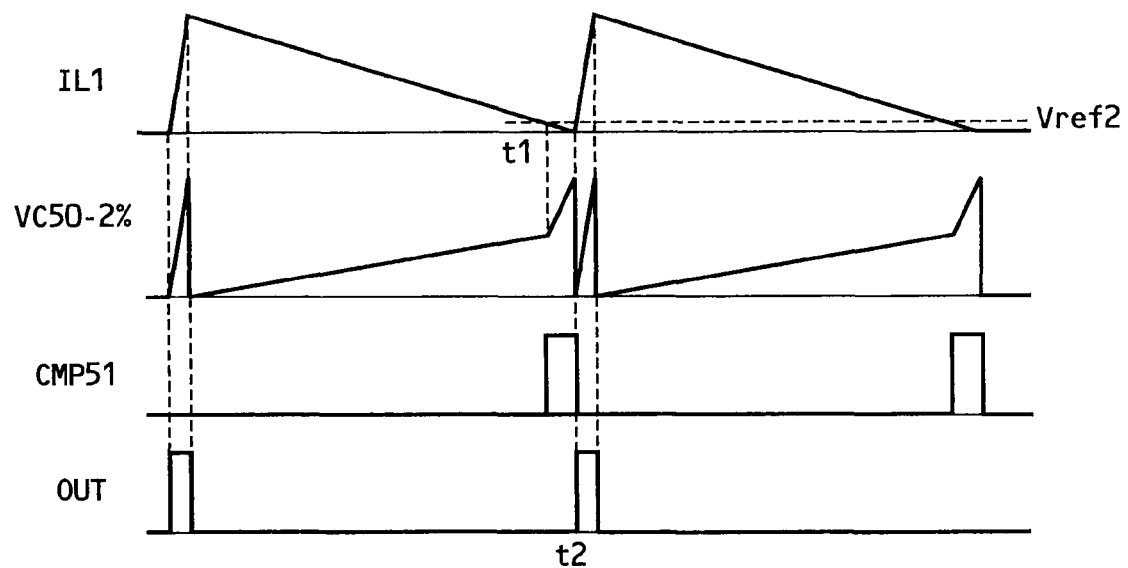
FIG. 14 is a waveform diagram illustrating operating waveforms at various parts of the power conversion apparatus of FIG. 12.

If the duty ratio difference becomes larger, the input currents become discontinuous even under interleave control. If the input currents are going to be discontinuous, the comparator CMP51 compares the input current signal Vis detected by the current sensing resistor R5 with the reference voltage Vref2, and at t1 in FIG. 14, detects a current starvation. Then, the comparator CMP51 provides a high-level output.

The high-level output from the comparator CMP51 turns on the MOSFET Q60 to add the adjustive current Iadj2 to the OFF-time signal Ioff. If the difference between the input voltage Vin and the output voltage Vo is small, the OFF-time signal Ioff is small. The sum of the OFF-time signal Ioff and adjustive current Iadj2 charges an oscillation capacitor C50, to sharply increase a voltage VC50 of the oscillation capacitor C50.

When the voltage VC50 exceeds the amplified error signal Vcmp, the comparator CMP50 provides a high-level output to turn on the MOSFET Q57, discharge the oscillation capacitor C50, and reset the flip-flop FF50. At time t2 in FIG. 14, the output OUT becomes high, and in the next cycle, the switching elements Q1 and Q2 turn on. This prevents the OFF time from inappropriately elongating.

Even if there is a detection error in the difference between the input voltage Vin and the output voltage Vo, the OFF time of the two-phase interleave converter will not be elongated longer than about two times an OFF time provided by the operation unit 14.

As mentioned above, the power conversion apparatus according to Embodiment 3 employs the first adjuster Iadj1 that elongates the duty ratio of the OFF time of the switching elements longer than a calculated duty ratio under a condition that a voltage difference between an input voltage and an output voltage is small and the second adjuster Vref2, CMP51, MOSFET Q60, and Iadj2 that shorten the OFF time of the switching elements when detecting an input current starvation of the converter. Accordingly, the power conversion apparatus according to Embodiment 3 is inexpensive without auxiliary windings, has high functions, and is capable of conducting good switching operation even when a difference between input and output voltages is small and a voltage detection error causes a large variation in an OFF time of switching elements.

According to Embodiment 3, the two-phase interleave converter is formed with eight terminals including an input voltage detection terminal VIN, an output voltage detection terminal FB, an input current detection terminal IS, a phase compensation terminal COMP, a first switching element drive terminal OUT1, a second switching element drive terminal OUT2, a power source terminal Vcc, and a ground terminal GND. Accordingly, the interleave converter of Embodiment 3 is inexpensive and achieves high performance.

Embodiment 4

Figure 15:
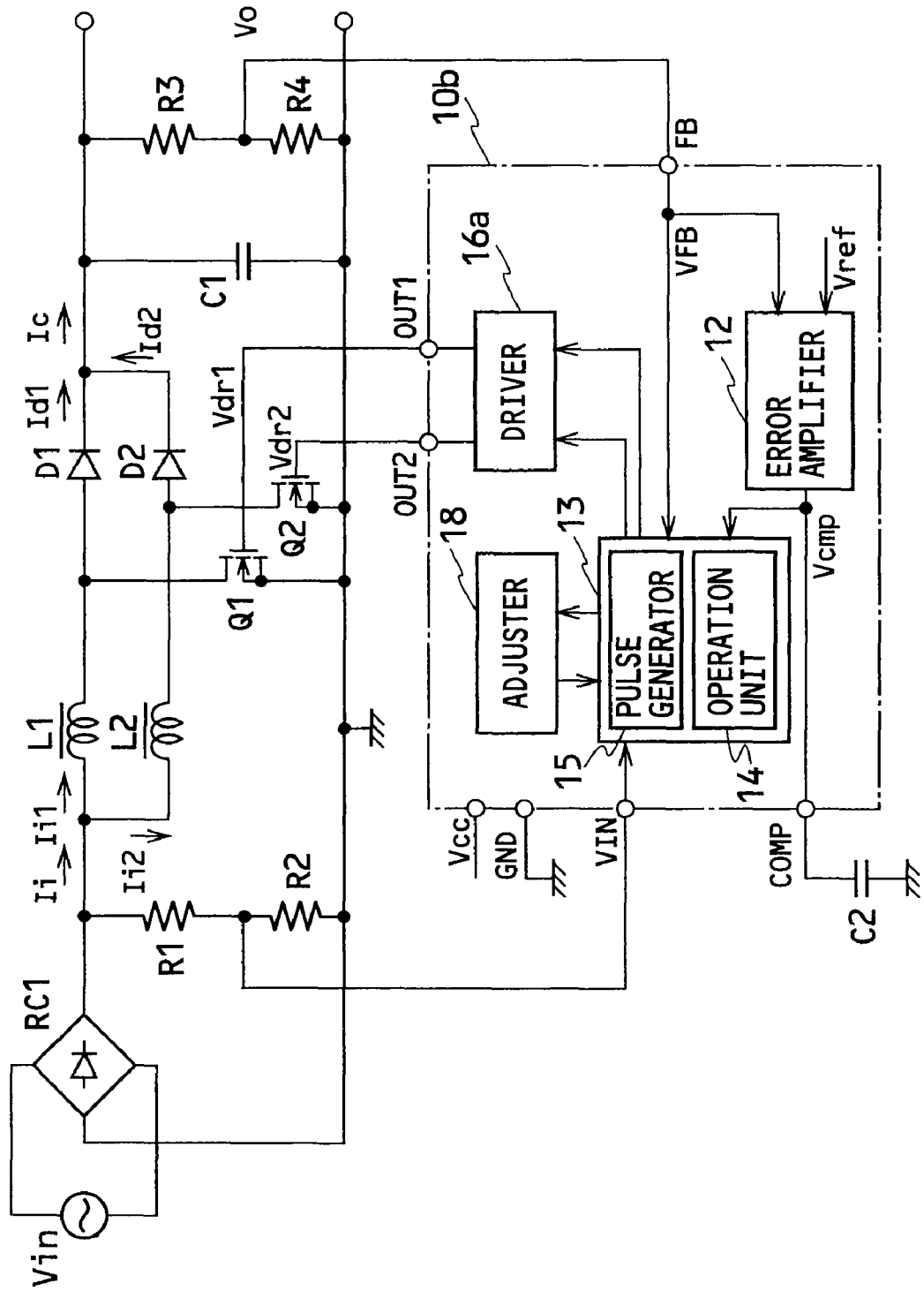
FIG. 15 is a circuit diagram illustrating a power conversion apparatus according to Embodiment 4 of the present invention.

FIG. 15 is a circuit diagram illustrating a power conversion apparatus according to Embodiment 4 of the present invention. Compared with Embodiment 3 of FIG. 12, Embodiment 4 of FIG. 15 employs the pulse generator 15 and adjuster 18 of Embodiment 2 of FIG. 9.

The interleave converter of Embodiment 4 provides a similar effect like the power conversion apparatus of Embodiment 2.

Embodiment 5

Figure 16:
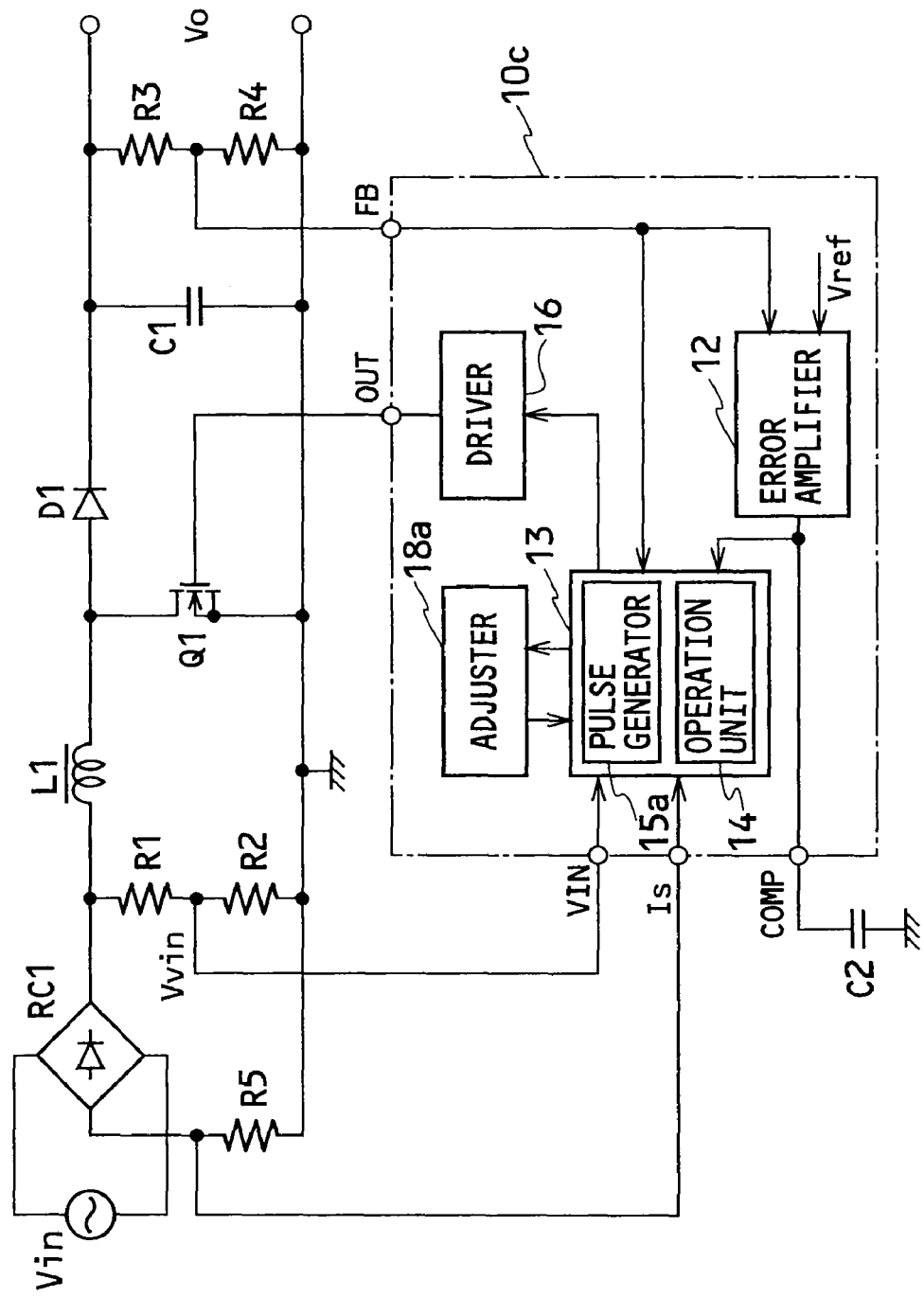
FIG. 16 is a circuit diagram illustrating a power conversion apparatus according to Embodiment 5 of the present invention.

FIG. 16 is a circuit diagram illustrating a power conversion apparatus according to Embodiment 5 of the present invention. Compared with Embodiment 2 of FIG. 9, Embodiment 5 of FIG. 16 employs the pulse generator 15a and adjuster 18a of Embodiment 3 of FIG. 12.

The power conversion apparatus of Embodiment 5 provides a similar effect like the power conversion apparatus of Embodiment 3.

The present invention is not limited to the power conversion apparatuses of Embodiments 1 to 5. For example, in the pulse generator 15a (FIG. 13) of Embodiment 3, the output of the comparator CMP51 may directly be connected to the output of the comparator CMP50, to provide similar operation and effect like the pulse generator 15a of Embodiment 3.

The power conversion apparatuses of Embodiments 2 to 5 may be combined together in various ways.

The power conversion apparatuses of Embodiments 1 to 5 each are a step-up power factor correction circuit. Each converter of Embodiments 1 to 5 may be a step-up DC/DC converter, or a step-down converter. It is possible to configure such that, when a detected input voltage is equal to or lower than a predetermined voltage, the first adjustive current Iadj1 is stopped, or the current value of the first adjustive current Iadj1 is changed.

The present invention is applicable to converters and interleave converters.

This application claims benefit of priority under 35 USC §119 to Japanese Patent Application No. 2009-222703, filed on Sep. 28, 2009, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power conversion apparatus comprising:
a converter having an input power source, a reactor, a switching element, and a rectifying element;
a smoothing capacitor connected to an output terminal of the converter; and
a controller configured to turn on/off the switching element and thereby control power to be outputted from the converter, the controller having:
a pulse generator configured to generate a pulse signal according to an input voltage to the converter and an output voltage from the converter, the switching element being turned on/off by the pulse signal; and
an adjuster configured to mask an ON time of the pulse signal for a predetermined time and thereby provide the pulse signal with an adjusted ON time, the adjusted ON time determining a duty ratio at which the switching element is turned on/off.

2. A power conversion apparatus comprising:
an interleave converter having an input power source and a plurality of converters that are connected in parallel with each other and each have a reactor, a switching element, and a rectifying element;
a smoothing capacitor connected to an output terminal of the interleave converter; and
a controller configured to turn on/off the switching elements of the converters and thereby control power to be outputted from the interleave converter, the controller having:
a pulse generator configured to generate pulse signals according to an input voltage to the interleave converter and an output voltage from the interleave converter, the switching elements being turned on/off by the pulse signals; and
an adjuster configured to mask an ON time of each pulse signal for a predetermined time and thereby provide the pulse signal with an adjusted ON time, the adjusted ON time determining a duty ratio at which each switching element is turned on/off.

3. The power conversion apparatus of claim 1, wherein the adjuster corrects the predetermined time in proportion to an input voltage to the converter.

4. The power conversion apparatus of claim 2, wherein the adjuster corrects the predetermined time in proportion to an input voltage to the interleave converter.

5. A power conversion apparatus comprising:
a converter having an input power source, a reactor, a switching element, and a rectifying element;
a smoothing capacitor connected to an output terminal of the converter; and
a controller configured to turn on/off the switching element and thereby control power to be outputted from the converter, the controller having:
a pulse generator configured to generate a pulse signal according to an input voltage to the converter and an output voltage from the converter, the switching element being turned on/off by the pulse signal; and
an adjuster configured to adjust a duty ratio of the pulse signal so as to extend an OFF time ratio of the switching element, the switching element being turned on/off by the adjusted duty ratio.

6. A power conversion apparatus comprising:
an interleave converter having an input power source and a plurality of converters that are connected in parallel with each other and each have a reactor, a switching element, and a rectifying element;
a smoothing capacitor connected to an output terminal of the interleave converter; and
a controller configured to turn on/off the switching elements of the converters and thereby control power to be outputted from the interleave converter, the controller having:
a pulse generator configured to generate pulse signals according to an input voltage to the interleave converter and an output voltage from the interleave converter, the switching elements being turned on/off by the pulse signals, respectively; and
an adjuster configured to adjust a duty ratio of each pulse signal so as to extend an OFF time ratio of each switching element, each switching element being turned on/off by the adjusted duty ratio.

7. The power conversion apparatus of claim 5, wherein the adjuster adjusts the duty ratio in proportion to an input voltage to the converter.

8. The power conversion apparatus of claim 6, wherein the adjuster adjusts the duty ratio in proportion to an input voltage to the interleave converter.

9. The power conversion apparatus of claim 1, further comprising:
a current detector configured to detect an input current passing through the converter; and
an ON control circuit provided for the controller and configured to switch the switching element from OFF to ON if the current detected by the current detector is equal to or lower than a threshold value.

10. The power conversion apparatus of claim 2, further comprising:
a current detector configured to detect an input current passing through the interleave converter; and
an ON control circuit provided for the controller and configured to switch each switching element from OFF to ON if the current detected by the current detector is equal to or lower than a threshold value.

11. The power conversion apparatus of claim 5, further comprising:
a current detector configured to detect an input current passing through the converter; and
an ON control circuit provided for the controller and configured to switch the switching element from OFF to ON if the current detected by the current detector is equal to or lower than a threshold value.

12. The power conversion apparatus of claim 6, further comprising:
a current detector configured to detect an input current passing through the interleave converter; and
an ON control circuit provided for the controller and configured to switch each switching element from OFF to ON if the current detected by the current detector is equal to or lower than a threshold value.

13. A controller for controlling power to be outputted from a converter, which has an input power source, a reactor, a switching element, and a rectifying element, by controlling ON/OFF of the switching element, the controller comprising:
a pulse generator configured to generate a pulse signal according to an input voltage to the converter and an output voltage from the converter, the switching element being turned on/off by the pulse signal; and
an adjuster configured to mask an ON time of the pulse signal for a predetermined time and thereby provide the pulse signal with an adjusted ON time, the adjusted ON time determining a duty ratio at which the switching element is turned on/off.

14. A controller for controlling power to be outputted from a converter, which has an input power source, a reactor, a switching element, and a rectifying element, by controlling ON/OFF of the switching element, the controller comprising:
- a pulse generator configured to generate a pulse signal according to an input voltage to the converter and an output voltage from the converter, the switching element being turned on/off by the pulse signal; and
- an adjuster configured to adjust a duty ratio of the pulse signal so as to extend an OFF time ratio of the switching element, the switching being turned on/off by the adjusted duty ratio.

15. The controller of claim 13, further comprising
an ON control circuit configured to switch the switching element from OFF to ON if a current passing through the converter is equal to or lower than a threshold value.

16. The controller of claim 14, further comprising
an ON control circuit configured to switch the switching element from OFF to ON if a current passing through the converter is equal to or lower than a threshold value.

* * * * *